United States Patent [19]
Imoto et al.

[11] Patent Number: 5,475,777
[45] Date of Patent: Dec. 12, 1995

[54] OPTICAL DEVICE WITH A PIG TAIL OPTICAL FIBER AND ITS PRODUCTION METHOD

[75] Inventors: Katsuyuki Imoto, Sayama; Hiroyuki Hoshino, Hitachi, both of Japan

[73] Assignee: Hitachi Cable, Ltd., Tokyo, Japan

[21] Appl. No.: 258,385

[22] Filed: Jun. 10, 1994

[30] Foreign Application Priority Data

Jun. 15, 1993 [JP] Japan .................................. 5-143240

[51] Int. Cl.⁶ .................................................. G02B 6/26
[52] U.S. Cl. .................... 385/28; 385/50; 385/88
[58] Field of Search ................... 385/28, 88, 50, 385/22, 45; 65/390

[56] References Cited

U.S. PATENT DOCUMENTS

| | | | |
|---|---|---|---|
| 4,900,114 | 2/1990 | Mortimore et al. | 385/43 X |
| 5,138,675 | 8/1992 | Schofield | 385/28 |
| 5,175,781 | 12/1992 | Hockaday et al. | 385/50 X |
| 5,231,683 | 7/1993 | Hockaday et al. | 385/50 X |
| 5,301,252 | 4/1994 | Yanagawa et al. | 385/28 X |
| 5,314,518 | 5/1994 | Ito et al. | 65/390 |
| 5,337,380 | 8/1994 | Darbon et al. | 385/28 |

FOREIGN PATENT DOCUMENTS

| | | |
|---|---|---|
| 0356872 | 3/1990 | European Pat. Off. . |
| 0424913 | 5/1991 | European Pat. Off. . |
| 60-051036 | 3/1985 | Japan . |
| 2259995A | 3/1993 | United Kingdom ............ 385/50 |

OTHER PUBLICATIONS

Low–Loss and Large–Tolerance Fiber Coupling of High–delta Silica Waveguides by Local Mode–Field Conversion by M. Yanagisawa et al,; *IEEE PHOTONICS TECHNOLOGY LETTERS*, vol. 5, No. 4, pp. 433–435; Apr. 1993, New York, US.

Vertical In/InGasÅsP Tapers for Low–loss Optical Fibre–Wavelength Coupling by T. Brenner et al.; *ELECTRONECS LETTERS*, vol. 28, No. 22, pp. 2040–2041; Oct. 22, 1992, Stevenage GB.

*Primary Examiner*—John D. Lee
*Assistant Examiner*—Phan T. H. Palmer
*Attorney, Agent, or Firm*—Antonelli, Terry, Stout & Kraus

[57] ABSTRACT

An optical waveguide with a specific refractive index difference $\Delta_1$ has a constitution in which a core with a high refractive index and having a rectangular section is built in a cladding layer with a low refractive index formed on a substrate. A pig tail optical fiber, formed by a first fiber serially connected to a second fiber, each having a different specific refractive index difference, is connected to an input terminal of the optical waveguide. The second fiber has a specific refractive index difference $\Delta_2$ ($<\Delta_1$) and is connected to a terminal of the first fiber which has a specific refractive index difference nearly equal to $\Delta_1$. A diffusion region in the neighborhood of the connection is formed by diffusing a dopant for refractive index control in the core of the second fiber by heat addition. Due to the diffusion region, the diameters of the first fiber and the second fiber are adjusted so as to be nearly equal.

12 Claims, 5 Drawing Sheets

FIG. 1(a)

FIG. 1(b) (A-A' SECTION VIEW)

(A-A' SECTION VIEW)

(A-A' SECTIONAL VIEW)

OPTICAL DEVICE WITH A PIG TAIL OPTICAL FIBER AND ITS PRODUCTION METHOD

BACKGROUND OF THE INVENTION

The present invention relates to an optical device with a pig tail optical fiber in which an optical fiber is connected to an optical waveguide. The invention relates more particularly to an optical device with a pig tail optical fiber having a optical fiber for mode adjustment which connects an optical fiber with a low specific refractive index difference and an optical waveguide with a high refractive index, and to its production method.

Research and development of a waveguide type optical device using quartz base glass have been actively carried out with the objectives of cost lowering, downsizing and advancing the functions of such an optical device.

Figure 6A:
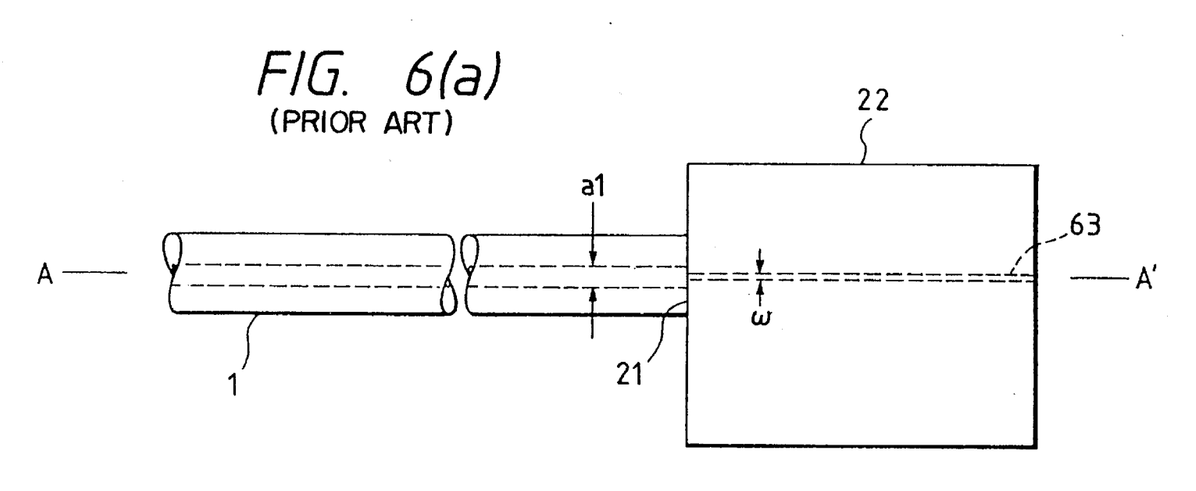
FIG. 6(a) is a plan view of a conventional optical device with a pig tail optical fiber.
Figure 6B:
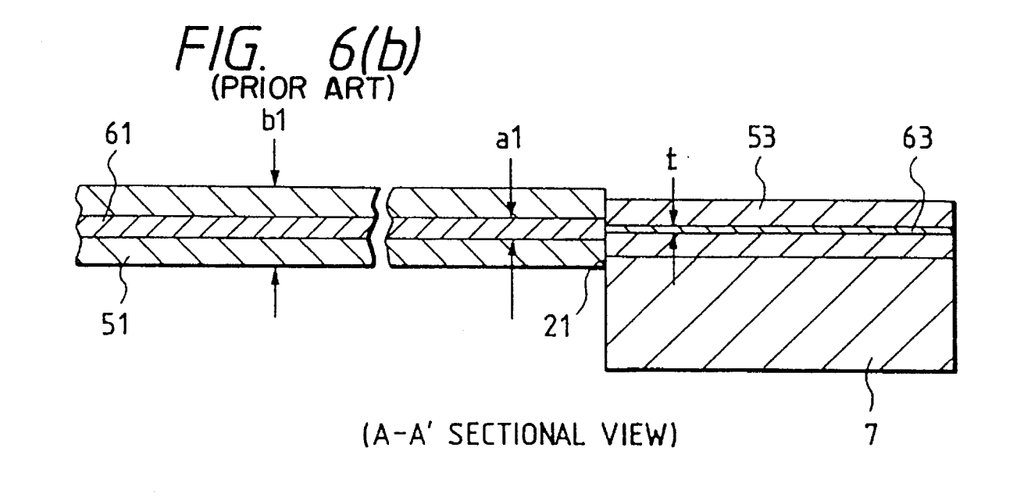
FIG. 6(b) is a sectional view taken along line A–A' in FIG. 6(a).

FIGS. 6(a) and 6(b) show the constitution of a conventional waveguide type device with a pig tail optical fiber. FIG. 6(a) is a plan view and FIG. 6(b) is a sectional view taken along line A–A' of FIG. 6(a). The device has structure in which a usual single mode fiber 1 is connected to an input terminal of an optical waveguide 22. The reason why a usual single mode fiber is employed as an optical fiber is that using a single mode fiber is indispensable to cost lowering of a waveguide type device with a pig tail optical fiber, since a single mode fiber is cheap, even though a low specific refractive index difference results.

The optical waveguide 22 has a core 63, having a rectangular cross-section with a width w and a thickness t built in a cladding 53 formed on a substrate 7 made from Si or $SiO_2$. The usual single mode fiber 1 has a core 61 with a diameter $a_1$ covered by a cladding 51 with an outer diameter $b_1$. The optical waveguide 22 and the usual single mode fiber 1 are connected by laser welding, for example.

If a specific refractive index difference $\Delta_1$ of the core 63 and the cladding 53 in the optical waveguide 22 is different from the specific refractive index difference $\Delta_2$ of the core 61 and the cladding 51 in the constitution shown in FIG. 6, it is known that the following problems may occur.

(1) A part of a light signal incident on the optical waveguide 22 from the usual single m,ode fiber 1 is reflected at the connection 21 of the waveguide 22 and the fiber 1, and then the strength of the light signal is reduced. On the other hand, the strength of a light signal incident on the usual mode fiber 1 from the optical waveguide 22 is also reduced. Consequently, a large connection loss results.

(2) The above-mentioned light reflection causes mutual interference between the light signals, which results in degradation of the transmission, such as an increase in cross talk.

(3) If $\Delta_2 < \Delta_1$, the condition that $a_1 > t$, w is to be satisfied. In that situation, a part of the light signal propagating in the usual single mode fiber 1 leaks from the core 63 of the optical waveguide 22 and propagates in the cladding 53. The light signal propagating in the cladding 53 gets abroad as it propagates in the optical waveguide 22 while repeating multiple reflections between the two terminal faces of the optical waveguide 22, which results in a degradation of light transmission characteristics, such as deterioration of the band characteristics, a rising and descending of the characteristics of the light pulse signal, an increase in cross talk and so on.

Providing a mode adjustment circuit in a waveguide, or applying the mode conjunction by diffusing the dopant for the reactive index distribution control in a core by heat addition to a terminal of an optical waveguide, is adopted in order to prevent the above-mentioned connection loss or characteristics degradation.

However, providing a mode adjustment circuit in a waveguide has the problem that it becomes difficult to downsize the optical device since the size of a waveguide will become considerably large when using the mode adjustment circuit. On the other hand, diffusing the core dopant at a terminal of the optical waveguide seems to avoid the above-mentioned problem; however, this approach raises the following problems.

(1) It is difficult to diffuse the dopant for the refractive index distribution control uniformly in the core, since an optical waveguide does not have a cylindrically symmetric structure as an optical fiber, but has a plate shape asymmetric structure. That is, since the distribution of the added heat is asymmetric, the diffusion of the dopant for the refractive index distribution control in a core becomes asymmetric. Consequently, a complete mode adjustment becomes very difficult, and an undesirable effect of polarization dependency is induced.

(2) In heating an optical waveguide, it is difficult to heat up the core and the cladding layer to the target temperature, since the substrate has a very much larger thickness than the diameters of the core and the cladding, and so a large part of the added heat is absorbed by the substrate.

(3) Furthermore, heating an optical waveguide causes the problem that it changes or degrades the optical transmitting characteristics of the optical waveguide and the other elements in the optical waveguide device, such as an optical branch circuit, an optical star coupler, an optical wave uniting or separating circuit, an optical filter, a ring optical resonance circuit and so on.

SUMMARY OF THE INVENTION

The present invention has been achieved in consideration of the above-described problems and aims at offering an optical device with a pig tail optical fiber having a low connection loss, a low reflection and low cross talk characteristics. Further, it is an object of the invention to realize a super-small-size optical device having a lower cost, by connecting an optical waveguide having a high specific refractive index difference and an optical fiber of a low specific refractive index difference via an optical fiber for mode adjustment, which frees the optical waveguide from the burden of mode adjustment and solves the above-mentioned problems of the prior art.

Further, another object of the invention is to offer a production method for easily adjusting the optical mode at the connection parts of optical fibers and to cheaply produce the above-mentioned optical device with a pig tail optical fiber.

The first feature of the present invention is that, in an optical device with a pig tail optical fiber connected to a terminal of an optical waveguide, wherein a core with a high specific refractive index having a rectangular section shape is built in a cladding layer with a low refractive index formed on a substrate, a terminal of a first optical fiber having a specific refractive index difference nearly equal to that of the optical waveguide is connected to a terminal of the optical waveguide, a second optical fiber with a lower specific refractive index difference than that of the optical waveguide is connected to the other terminal of the first optical fiber, and the first optical fiber has nearly the same mode field diameter as that of the second optical fiber in a connection part of the first optical fiber and the second optical fiber.

The second feature of the present invention is that the optical waveguide having the first feature of the present invention has at least one terminal at each of an input terminal and an output terminal in terminal parts of the optical waveguide, and optical fibers comprising the first optical fiber serially connected to the second optical fiber are connected to each terminal of the input terminal and the output terminal.

Since the mode adjustment at each connection part of the optical waveguide and the first optical fiber, or the second and third optical fiber, is established by the first and the second feature of the present invention, a reflection does not occur at each connection part. Thus, it is possible to transmit light signals with low loss, and low cross talk characteristics can be attained, since a mutual interference between the propagating light and the reflecting light does not arise. Furthermore, the specific refractive index difference $\Delta_1 = \{((n_w - n_c)/n_w) \times 100\%\}$ determined by the core refractive index $n_w$ and the cladding refractive index $n_c$ can be set to a high value, since mode adjustment is established at the connection part at both sides of which the optical devices have a large difference between their specific refractive index differences. Then, the efficiency of confining light signals in the core is improved and the size of the core pattern in the optical waveguide is reduced, which make it possible to realize a core pattern with a small curvature. Consequently, a super-small-size optical waveguide and a super-small-size optical waveguide circuit using the waveguide are realized, which reduces the production cost of the optical device.

The third feature of the present invention is that at least one of the core patterns of a straight line, parallel lines, a ring and a Y character shape is formed in the optical waveguide having the first or the second feature of the present invention.

By the third feature of the present invention, such optical devices as an optical directional coupling circuit, an optical branching/combining circuit, an optical star coupler, an optical wave composing and separating circuit, an optical filter and so are made in a super-small-size by utilizing a core pattern, such as a straight line, parallel lines, a curve, a ring or a Y character shape. Since it is possible to realize a very large specific refractive index difference of an optical waveguide, as mentioned above, it is possible to reduce the light radiation loss in a curved core pattern. The thickness of the cladding can be reduced and the production process simplified due to the high efficiency of confining light signals in the core of the optical waveguide. By providing a super-small-size device, the loss of optical propagation is considerably decreased.

The fourth feature of the present invention is that at least one active optical element is provided at the optical waveguide which incorporates the first or the third feature of the present invention.

By the fourth feature of the present invention, it is possible to efficiently oscillate a light signal in the core since the core of the optical waveguide also has a high refractive index in the case of providing active elements, such as a semiconductor laser device, which have a high refractive index of 2–3.6.

The fifth feature of the present invention is that a third optical fiber, to which rare earth elements are added, having nearly the same specific refractive index difference as that of the optical waveguide, is connected to the first optical fiber and the second optical fiber have the first or the fourth feature of the present invention, and the third optical fiber has nearly the same mode field diameter as the mode field diameter of each of the first optical fiber and the second optical fiber at each connection part to said first optical fiber and second optical fiber.

In the fifth feature of the present invention, the third optical fiber, to which the rare earth elements are added, is inserted between the first and the second optical fibers. In order to realize a high amplification degree of an optical fiber containing rare earth elements, usually, its core diameter is decreased enough (by more than 50%) compared with that of a usual single mode fiber, and its specific refractive index difference is increased enough (more than 2 times) compared with that of a usual single mode fiber. Then, the mode adjustment between the optical waveguide and the first optical fiber having a high specific refractive index difference is easily established, and a connection with high efficiency is realized. Furthermore, a transmitting system having high stability and a high amplification degree can be realized, since mode adjustment is established at each connection part in the constitution based on the present invention; although a transmitting system using the third fiber containing rare earth elements amplifies a light signal but gets very unstable due to resonant oscillation if a little reflective light exists.

The sixth feature of the present invention is that, in the method for producing an optical device with a pig tail optical fiber according to the first or the fifth feature of the present invention, both side mode field diameters at the connection parts are adjusted to have nearly the same value by diffusing a part of the dopant for refractive index control of a core of the first optical fiber by addition of heat near to the connection part to the second optical fiber or a core of the third optical fiber near to the connection part to the second optical fiber, thereby equalizing both side mode field diameters at the connection part of the first and second optical fibers or the second and third optical fibers. In case of equalizing both side mode field diameters at the connection part of the first and second optical fibers, or the second and third optical fibers, a method of condensing or aggregating a part of the dopant for refractive index control of the core near the connection parts is also applicable besides the above-mentioned method.

As an overall feature of the present invention, it can be mentioned that an optical device of the present invention is very effectively applied to coherent optical transmission due to its low reflection and low cross talk characteristics. Furthermore, an optical device of the present invention will scarcely induce the connection loss at the connection parts (less than 03. Db) and is suitably applied also to long distance transmission.

BRIEF DESCRIPTION OF THE DRAWINGS

FIG. 1 (b) is a sectional view taken along line A–A' in FIG.

DETAILED DESCRIPTION OF THE EMBODIMENTS

Figure 1A:
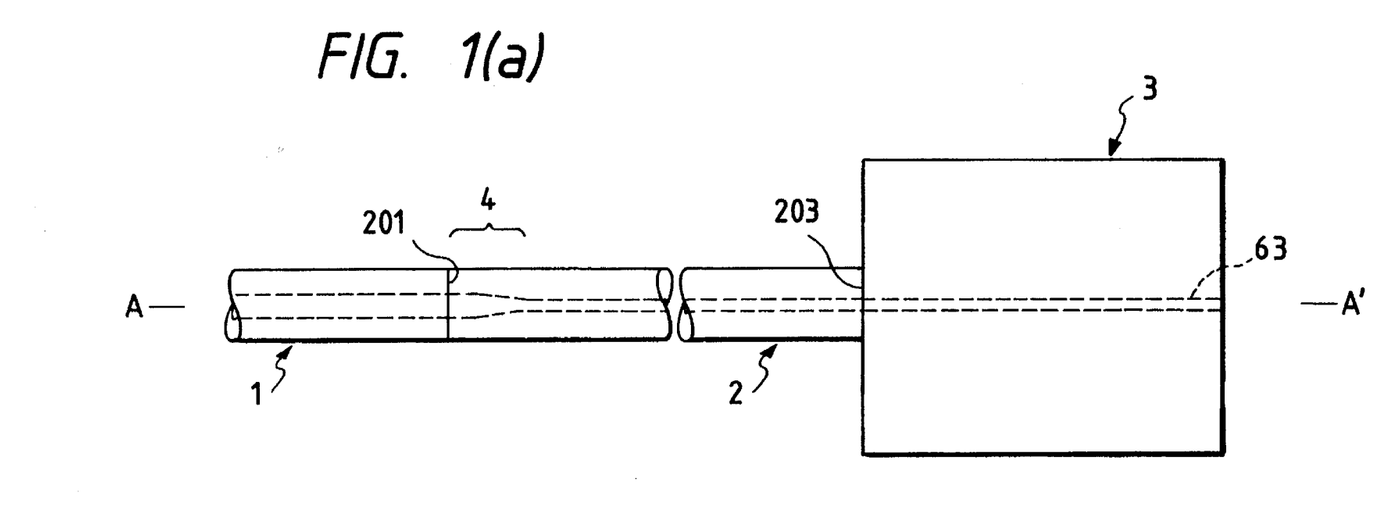
FIG. 1(a) is a plan view of an optical device with a pig tail optical fiber according to a first embodiment of the present invention.
Figure 1B:
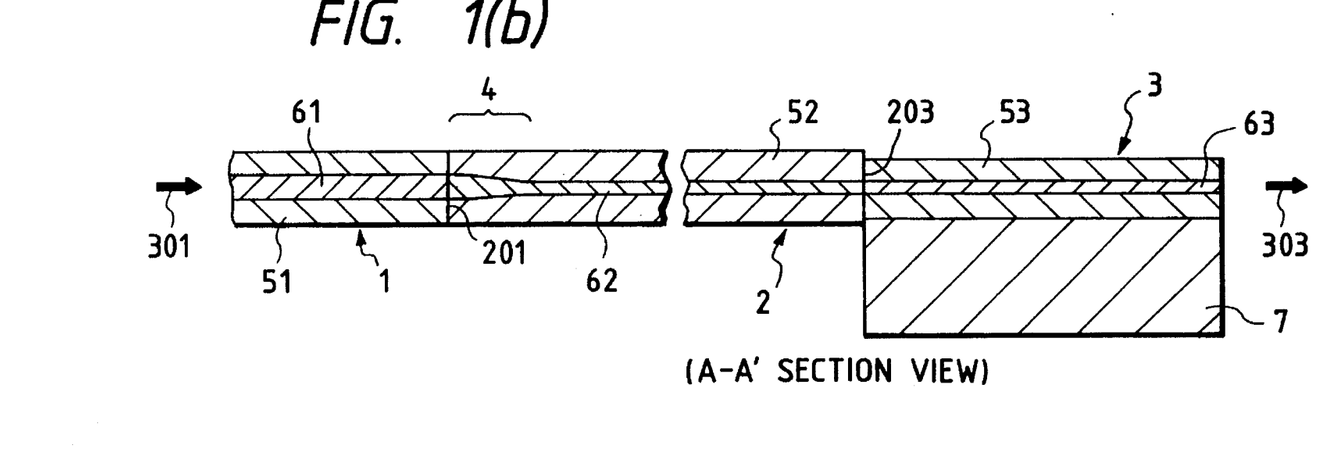

FIGS. 1(a) and 1(b) show the constitution of a first embodiment of an optical device with a pig tail optical fiber according to the present invention. FIG. 1(a) is a plan view and FIG. 1(b) is a sectional view taken along line A–A' of FIG. 1(a). The embodiment is an optical device with a pig tail optical fiber having the constitution in which an optical waveguide 3 with a high specific refractive index difference a $\Delta_1$, a single mode fiber 2 with a high specific refractive index difference A m and a usual single mode fiber 1 with a low specific refractive index difference $\Delta_2$ ($\Delta_2 < \Delta_1$) are connected and united. The optical waveguide 3 with a high specific refractive index difference and the single mode fiber 2 with a high specific refractive index difference are connected at a connection 203 and adjusted for the optical mode. The single mode fiber 2 with a high specific refractive index difference and the usual single mode fiber 1 with a low specific refractive index difference are connected at a connection 201. Since the two refractive indices $\Delta_1$ and $\Delta_2$ are different ($\Delta_2$ and $\Delta_1$), a part of the dopant for refractive index control (for example, $GeO_2$) of the core of the single mode fiber 2 having a high specific refractive index difference is diffused and exuded into the cladding, and so a diffusion region 4 of the core is formed in the neighborhood of the connection 201, by heating the outer part near the connection 201 of the single mode fiber 2 with a specific high refractive index difference using a heat source (not shown in the figure). Due to the diffusion region 4, the two mode field diameters near the connection 201 of the optical fibers 1 and 2 are adjusted.

The optical waveguide 3 with a high specific refractive index, is constructed so that the core of a rectangular section is built in the cladding 53 formed on a substrate 7. For the substrate 7, a semiconductor material (Si, GaAs, InP, etc.), glass (quartz glass, multi-component glass, etc.), dielectric substance ($LiN_6O_3$, $LiTaO_3$, etc.), magnetic substance (Bi:YIG, YIG, etc.), plastic material (epoxy resin, polycarbonate, Teflon, etc.) and so on are applicable. The above-mentioned material can be applied to the core 63 and the cladding 53.

Next, an example of the optical device with a pig tail optical fiber, to which the above-mentioned optical fiber for mode adjustment is applied, will be described.

A Si substrate is used for the substrate 7 and $SiO_2$ for cladding 63. $SiO_2$, having $GeO_2$ doped therein, is used for the core 63. The specific refractive index difference $\Delta_1$ is 2% and the thickness and the width of the core 63 are 3 μm. $SiO_2$, having $GeO_2$ doped therein, is used for the core 62, and its diameter is 3 μm. $SiO_2$ is applied to the cladding 52, and its diameter is 125 μm. The specific refractive index difference of the optical fiber 2 has the same value of 2% as that of the optical waveguide 3, and mode adjustment is established at the connection part 203. The usual single mode optical fiber 1 has a core 61 with a 10 μm diameter, a cladding 51 with a 125 μm diameter and a specific refractive index difference $\Delta_2$ of 0.25%.

The diffusion region 4 of the core formed by heating is formed as follows. At first, the fibers 1 and 2 are connected by a fusion combining process using an arc discharge at the connection 201. After the fusion combining, as the first fiber 1 is slowly moved along the axis of A–A' in the direction to A, $GeO_2$ near the connection part in the core 62 of the fiber 2 is diffused into the cladding 52 by using the heat of the arc discharge, while decreasing the diffused quantity of $GeO_2$ along the axis of A–A' in the direction toward A', and thus a mode adjustment at the connection 201 is realized.

Since the mode adjustments at the connections 201 and 203 are realized without causing any problems in the optical waveguide by introducing the constitution of providing the optical fiber for the mode adjustment between the two optical fibers, a light signal 301 propagating in the usual single mode fiber 1 propagates in the direction toward A' without reflection, and a light signal 303 is outputted from the other terminal face of the optical waveguide 3.

Figure 2A:
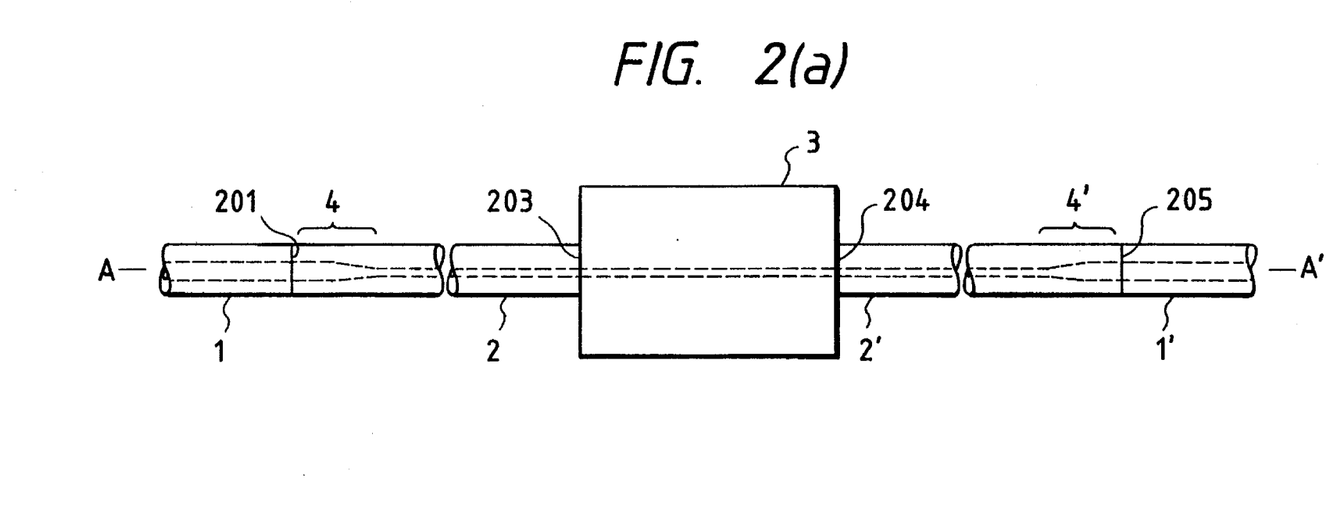
FIG. 2(a) is a plan view of an optical device with a pig tail optical fiber according to a second embodiment of the present invention.
Figure 2B:
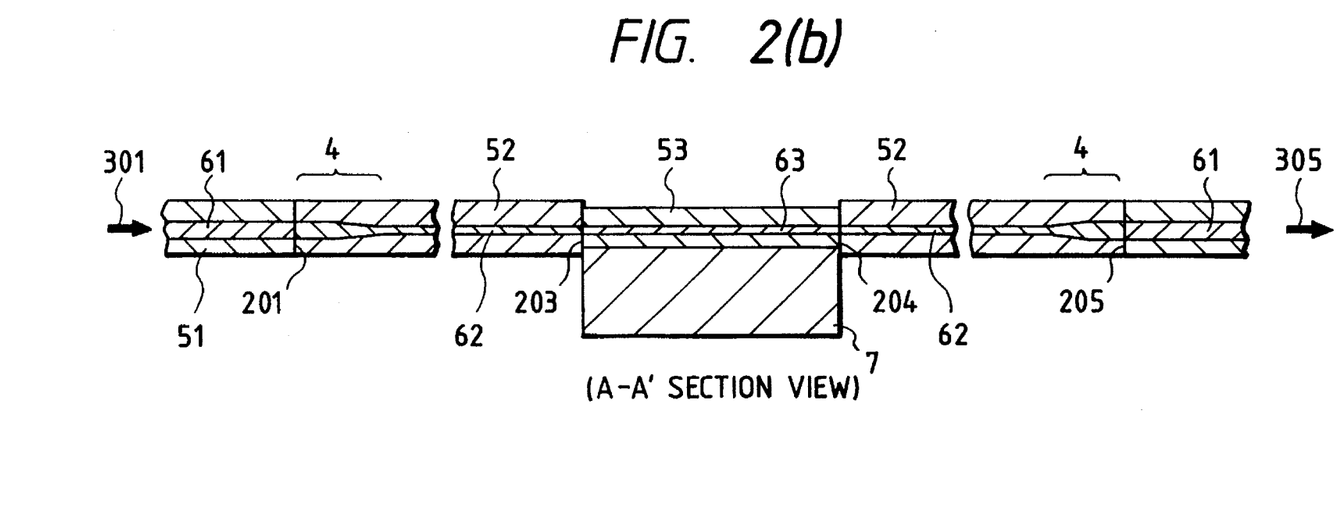
FIG. 2(b) is a sectional view taken along line A–A' in FIG. 2(a).

FIGS. 2(a) and 2(b) show the constitution of a second embodiment of an optical device with a pig tail optical fiber according to the present invention. FIG. 2(a) is a plan view and FIG. 2(b) is a sectional view taken along line A–A' of FIG. 2(a). In the embodiment, a set of pig tail fibers 2 and 1 and a further set of pig tail fibers 2' and 1' are symmetrically connected to the left and the right terminal faces of the optical waveguide 3 with a high specific refractive index difference, respectively. A light signal 301 propagating in the usual single mode fiber 1 propagates in the direction from A to A' without reflection, and a light signal 305 is taken out from the usual single mode fiber 1'. Since mode adjustments at the connections 201, 203, 204 and 205 are established, and light reflections are suppressed at the connections, the light signal is propagated with low loss. In FIGS. 1(b) and 2(b), even if the propagating direction of the light signal is opposite to the direction of the arrow, the present invention is applicable.

Figure 3:
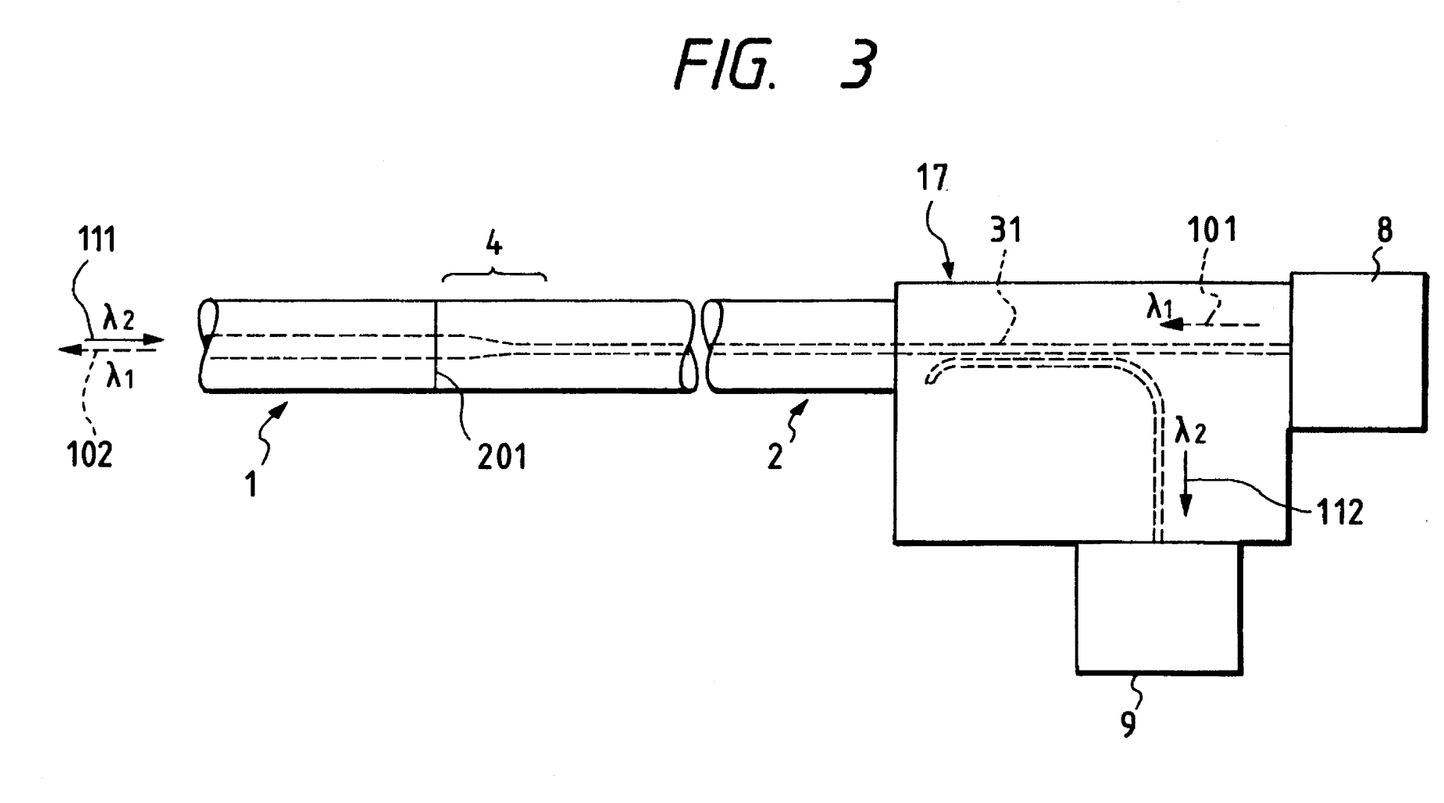
FIG. 3 is a plan view of an optical device with a pig tail optical fiber according to a third embodiment of the present invention.

FIG. 3 shows a third embodiment of an optical device with a pig tail optical fiber according to the present invention. In the constitution as shown in FIG. 3, the structure and connection method of the single mode fiber 2 with a high specific refractive index difference and the usual single mode fiber 1 are the same as the embodiments described in FIGS. 1 and 2. This embodiment is different in that it employs an optical waveguide circuit 17 with a high specific refractive index difference in place of the optical waveguide circuit with a high specific refractive index difference as used in the embodiments described in FIGS. 1 and 2.

That is, an optical branching circuit 31 for separating light signals of wavelengths $\lambda_1$ and $\lambda_2$ is formed in the optical waveguide circuit 17. A semiconductor laser element 8, provided at a terminal of the optical waveguide circuit 31 with three terminals, emits a light signal of a wave length $\lambda_1$, and the emitted light signal propagates in the direction shown by the arrow 101 in the optical waveguide circuit 31 and further propagates in the single mode fiber 2 which a high specific refractive index difference which is connected to another terminal and the usual single mode fiber 1 in the direction shown by the arrow 102. On the other hand, a light signal of a wave length $\lambda_2$, propagated in the direction shown by the arrow 111, enters the optical waveguide circuit 17 through the usual single mode fiber 1 and the single mode fiber 2 with a high specific refractive index difference, separated by the optical branching circuit 31, propagates in the optical waveguide circuit 17 in the direction shown by the arrow 112 and is received by a photoreceiving element 9 provided at the remaining terminal.

Figure 4:
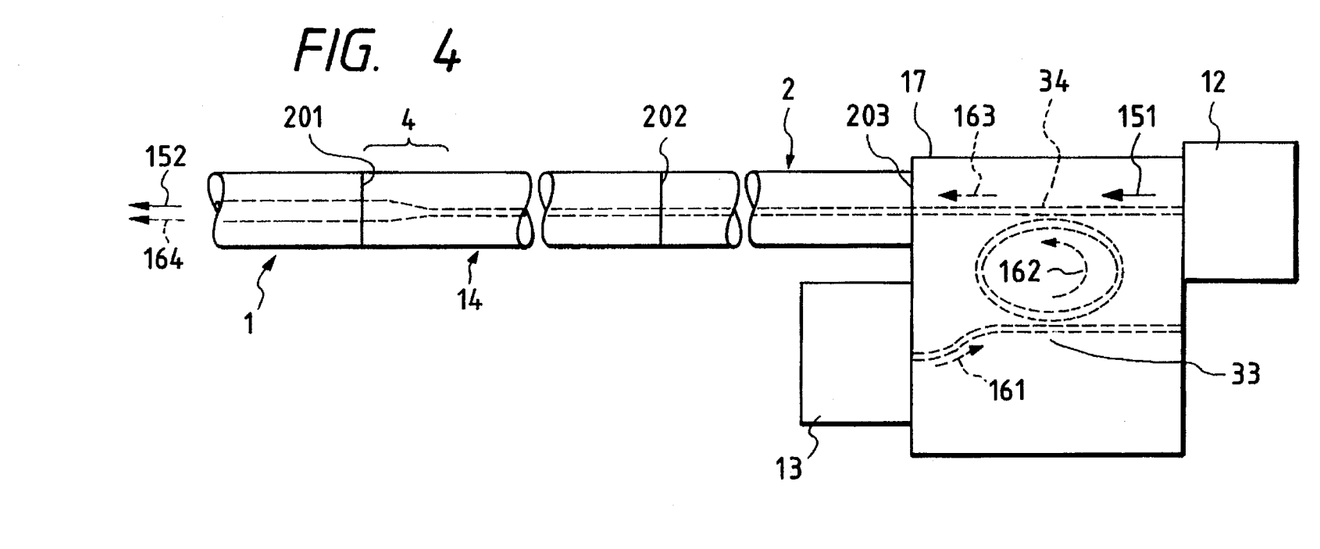
FIG. 4 is a plan view of an optical device with a pig tail optical fiber according to a fourth embodiment of the present invention.

FIG. 4 shows a fourth embodiment of an optical device with a pig tail optical fiber according to the present invention. In this embodiment, a single mode fiber 14 containing rare earth elements with a specific refractive index difference nearly equal to $\Delta_1$ is inserted between the single mode fiber 2 with a high specific refractive index difference and the usual single mode fiber 1, and amplifies a light signal 151 emitted from a semiconductor laser element 12 and sends it in the direction shown by the arrow 152.

The single mode fiber 14 containing rare earth elements includes at least one of the rare earth elements Er, Nd, Py, Yb, Ce, Sm, Ho, Tm, etc. Usually, such kind of fiber has a very much smaller core diameter and a very much larger specific refractive index difference than the usual single mode fiber in order to realize a high amplifying degree. Then, in this embodiment, the device is composed so that the specific refractive index difference of the single mode fiber 14 containing rare earth elements is equalized to the value of $\Delta_1$ of the optical waveguide circuit 17 with a high specific refractive index difference. By this constitution, the optical waveguide circuit 17 with a high specific refractive index difference and the single mode fiber 2 with a high specific refractive index difference are connected to each other at the connection 203 in the state of establishing a mode adjustment. Furthermore, the single mode fiber 14 containing rare earth elements and the single mode fiber 2 with a high specific refractive index difference are also connected to each other at the connection part 202 in the state of establishing a mode adjustment.

However, since the single mode fiber 14 containing rare earth elements and the usual single mode fiber 1 are not in the state of establishing a mode adjustment, the mode adjustment is realized by providing the diffusion region 4 of the core by addition of heat to the neighborhood of the connection part to the single mode fiber 14 containing rare earth elements.

Further, at the optical waveguide circuit 17, a semiconductor laser element 12 to emit light for light signals and a semiconductor laser element 13 to emit light for light resonance oscillation are provided, and the two kinds of light are combined in a ring light resonance oscillation circuit 33 and sent into the single mode fiber 2 with a high specific refractive index difference.

That is, the light for light signals from the semiconductor laser element 12 (for example, a laser having 1.55 μm wave band is used in the laser element 12 if Er is used as the rare earth element to be added to the single mode fiber 14) goes through the core of the optical waveguide circuit 17 as shown by the arrow 151 and propagates in the fiber as shown by the arrow 152. On the other hand, the light from the semiconductor laser element 13 for exciting the light resonance oscillation (which is a light source emitting the light of 1.48 μm or 0.98 μm wave length) propagates in the core of the optical waveguide as shown by the arrow 161. Then, the light resonates by the ring light resonance oscillation circuit 33, propagates in the ring as shown by the arrow 162, is taken out by an optical directional coupling circuit 34 as shown by the arrow 163 and propagates in the fiber as shown by the arrow 164.

Further, the diameter near the connection 202 of the single mode fiber 14 containing rare earth elements is nearly equal to that of the single mode fiber 2 with a high specific refractive index difference.

The constitution as shown in FIG. 4 easily realizes a long distance transmission and a distributed transmission since the light signal being transmitted is amplified. And, it is possible to compose a highly reliable optical transmitting system, since the semiconductor lasers 12 and 13 operate stably due to little light reflection.

Furthermore, although such core patterns in the optical waveguide circuit 17 as a straight line, parallel lines, a curve and a ring are presented in the embodiments, other core patterns such as a Y character shape can also offer effective applications of the present invention. And, useful applications of the present invention can be realized also by a constitution in which, after the single mode fiber 14 containing rare earth elements is directly connected to the optical waveguide circuit 7 without using the single mode fiber 2 of high specific refractive index difference, the usual single mode fiber 1 is connected to the single mode fiber 14.

And, an optical amplifying circuit having a higher amplification degree is realized since amplifying a light signal 151 in the optical waveguide circuit 17 becomes possible by making the core of the optical waveguide 17 with a high specific refractive index difference contain rare earth elements.

Figure 5:
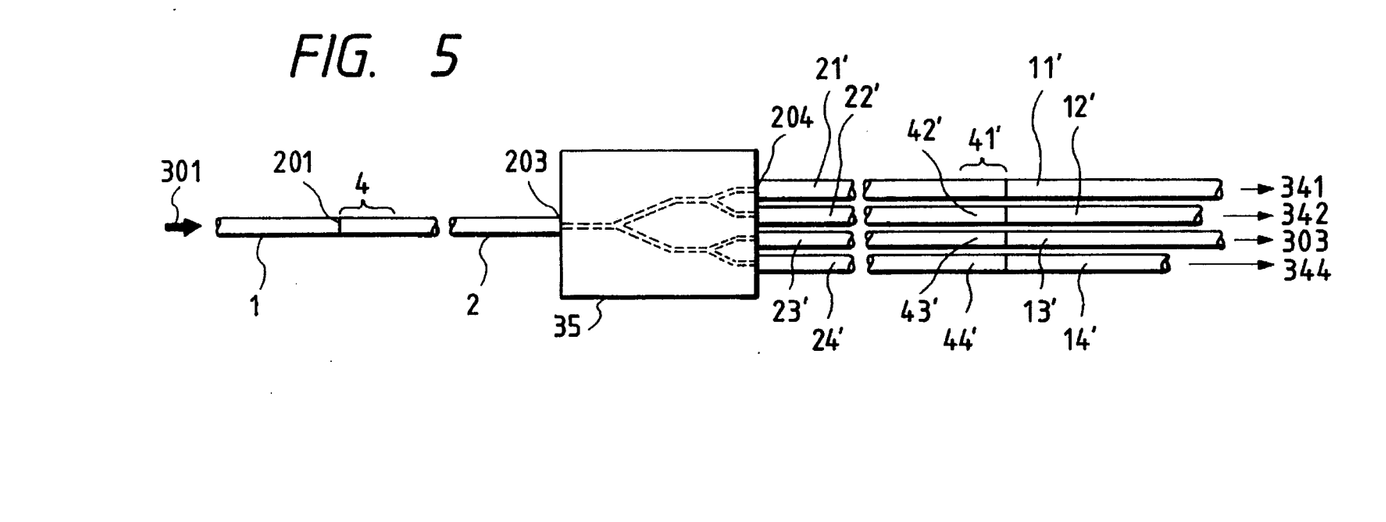
FIG. 5 is a plan view of an optical device with a pig tail optical fiber according to a fifth embodiment of the present invention.

FIG. 5 shows a fifth embodiment of an optical device with a pig tail optical fiber in accordance with the present invention. The embodiment is an example of the present invention applied to a constitution in which the optical waveguide circuit has at least one terminal for each of the light input terminal and the light output terminal and adopts an optical star coupler 35 with one input and four outputs. The single mode fiber 2 is connected to the input terminal of the optical star coupler 35, and single mode fibers 21', 22', 23' and 24' with a high specific refractive index difference are connected to the four output terminals.

The usual single mode fibers 1, 11', 12', 13' and 14' are connected to the single mode fibers 2, 21', 22', 23' and 24' with a high specific refractive index difference through the diffusion regions 4, 41', 42', 43' and 44' of the cores formed by heat addition. The light signal 301 inputted into the usual single mode fiber 1 is dispersed in four signals, and the signals are outputted as output signals 341, 342, 343 and 344 from the usual single mode fibers 11', 12', 13' and 14'.

By adopting the present invention, the following effects may be expected.

(1) By the features of the present invention described in the first, the second or the fifth embodiments, the constitution of an optical device becomes simple and can be downsized since it is not necessary to provide a mode adjustment circuit in the optical waveguide. Further, since the specific refractive index difference of the optical waveguide can be considerably increased, a super-downsizing and a cost reduction of the optical device are possible. And, a cost reduction by mass production is also possible since many optical circuits and optical devices can be produced from one substrate. Furthermore, a high quality mode adjustment is easily and cheaply realized, since the mode field diameter at the connection part is adjusted by diffusing the core dopant, and the mode adjustment is established by optical fibers having a cylindrical structure. By the high quality of mode adjustment, the light reflection can be suppressed, and low cross talk and low loss characteristics are obtained.

(2) By the features of the present invention described in the third embodiment, since the radius of curvature of the core patterns, such as a curve, a ring, etc. in the optical waveguide, can be decreased due to the high specific refractive index of the optical waveguide based on the present invention, the thickness of the cladding can be reduced by improvement of the confinement efficiency of the light in the core, and an easy and cheap production of the optical waveguide can be realized, to say nothing of the low loss characteristics.

(3) By the features of the present invention described in the fourth embodiment, since an optical active element having as high a refractive index as the optical waveguide is provided in the optical waveguide, a light signal can be efficiently resonated in the core. Further, the fiber containing the rare earth elements is easily connected, and it is possible to achieve an optical transmitting system having high amplification characteristics and stability.

The present invention is not restricted only to the above-described embodiments. The spirit and scope of the present invention are to be limited only by the terms of the appended claims. For example, $SiO_xN_yH_z$ or $Si_3N_4$ can be used as the material for the core and the cladding of the optical waveguide with a high specific refractive index difference besides the $SiO_2$ material. And, as the specific refractive index difference of the optical waveguide the value $\Delta_1$ of 1% –5%, or a higher value $\Delta_1$ than that value, is also effective. As the material for the core and the cladding of the single mode fiber 2 with a high specific refractive index difference, $SiO_2$ or a $SiO_2$ base material containing at least one of $GeO_2$, $P_2O_5$, $TiO_2$, $Al_2O_3$, $ZnO$, $Zn_2O_3$, $B_2O_3$, F, etc. can be used, and as the specific refractive index difference of the single mode fiber 2, the value $\Delta_1$ of 1% –5% or a higher value $\Delta_1$ than that value is also effective. The specific refractive index difference is set equal to that of the optical waveguide with a high specific refractive index difference. Additionally, at least one of the rare earth elements such as Er, Pr, Yb, Ce, Sm, Ho, Tm, etc. is contained in the core of the optical waveguide with a high specific refractive index difference. By containing such rare earth elements, the optical waveguide itself can have an optical amplifying or an optical resonance oscillation function.

A length of more than 5 cm is effective as the length of the single mode fiber with a high specific refractive index difference, and a length of 50 cm —several m is desirable usually from the viewpoint of easy treatment. The needed length of the single mode fiber 14 containing rare earth elements with a high specific refractive index difference depends on the amplification degree. And, the amplification degree depends on the quantity of the added rare earth elements, the power of the light excitation for resonance oscillation, the specific refractive index difference, the core diameter and so on. From those conditions, a length of more than 10 m and within 100 m is desirable as the length of the fiber 14. It is permissible that the diameter of each of the single mode fiber 2 with a high specific refractive index, the single mode fiber 14 containing rare earth elements and the usual single mode fiber 1 has a different value, respectively.

What is claimed is:

1. An optical device comprising:
   an optical waveguide having a terminal and having a core with a rectangular cross-section disposed in a cladding layer of lower refractive index than the core; and
   a pig tail optical fiber including a first optical fiber portion having a circular-cross-section with a specific refractive index difference equal to or higher by up to 1% than that of said optical waveguide, and having a first terminal and a second terminal, the first terminal being connected to the terminal of said optical waveguide, and including a second optical fiber portion having a circular cross section with a specific refractive index difference lower by up to 0.5% than that of said optical waveguide, and having a terminal connected to the second terminal of said first optical fiber portion, said first optical fiber portion having the same or nearly the same mode field diameter as that of said second optical fiber portion at the point of connection of said first optical fiber portion and said second optical fiber portion.

2. An optical device with a pig tail optical fiber according to claim 1, wherein said optical waveguide has at least one terminal at each of an input terminal region and an output terminal region of said optical waveguide, and said pig tail optical fiber includes a respective pig tail optical fiber member connected to each of said terminal regions, each optical fiber member including a first optical fiber portion serially connected to a second optical fiber portion.

3. An optical device with a pig tail optical fiber according to claim 2, wherein said optical waveguide includes a passive optical circuit having a core pattern of at least one of a straight line, parallel lines, a ring, and a Y character shape.

4. An optical device with a pig tail optical fiber according to claim 3, wherein at least one active optical element is provided at said optical waveguide.

5. An optical device with a pig tail optical fiber according to any one of claims 1 to 4, wherein said first optical fiber is composed of first and second fiber elements and said first fiber element is connected to said terminal of said optical waveguide and said second fiber element contains at least one rare earth element and is interposed between said first fiber element and said second optical fiber, said second fiber element having the same or nearly the same specific refractive difference as that of said optical waveguide and having the same or nearly the same mode field diameter as the mode field diameter of said first optical fiber and said first fiber element at its respective connections thereto.

6. An optical device according to any one of claims 1 to 4, wherein said first optical fiber contains at least one rare earth element.

7. An optical device with a pig tail optical fiber according to any one of claims 1 to 4, wherein said first optical fiber portion includes a diffusion region produced by heating a part of the dopant for refractive index control of a core of said first optical fiber portion near to said connection of said first optical fiber portion and said second optical fiber portion to equalize the two mode field diameters at said connection.

8. An optical device with a pig tail optical fiber according to claim 1, wherein at least one active optical element is provided at said optical waveguide.

9. An optical device with a pig tail optical fiber according to claim 2, wherein at least one active optical element is provided at said optical waveguide.

10. An optical device with a pig tail optical fiber according to claim 1, wherein said optical waveguide includes a passive optical circuit having a core pattern of at least one of a straight line, parallel lines, a ring, and a Y character shape.

11. An optical device with a pig tail optical fiber according to claim 5, wherein said first optical fiber portion includes a diffusion region produced by heating a part of the dopant for refractive index control of a core of said first optical fiber portion near to said connection of said first optical fiber portion and said second optical fiber portion to equalize the two mode field diameters at said connection.

12. A method of producing an optical device including an optical waveguide, having a rectangular cross-section and having a terminal, and a pig tail optical fiber including a first optical fiber portion having a circular cross-section with a specific refractive index difference substantially equal to or higher by up to 1% than that of said optical waveguide, and having a first terminal and a second terminal, the first terminal being connected to the terminal of said optical waveguide, and including a second optical fiber portion, having a circular cross-section with a specific refractive index difference lower by up to 0.5% than that of said optical waveguide and having a terminal connected to the second terminal of said first optical fiber portion, said method comprising the steps of:

producing said first optical fiber portion with a core having a dopant for refractive index control and a cladding surrounding the core, so that the core has a mode field diameter substantially equal to that of said optical waveguide; and diffusing the dopant of the core in the neighborhood of said second terminal of said first optical fiber portion by applying heat thereto until the mode field diameter of said first optical fiber portion is substantially the same as that of said second optical fiber portion at said second terminal of said first optical fiber portion.

* * * * *